(12) United States Patent
Linder et al.

(10) Patent No.: US 9,089,940 B2
(45) Date of Patent: Jul. 28, 2015

(54) DRIVE DEVICE

(75) Inventors: Dietmar Linder, Dettingen (DE); Jürgen Stiefel, Kohlberg (DE)

(73) Assignee: Sauter Feinmechanik GmbH, Metzingen (DE)

( * ) Notice: Subject to any disclaimer, the term of this patent is extended or adjusted under 35 U.S.C. 154(b) by 512 days.

(21) Appl. No.: 13/261,215

(22) PCT Filed: Sep. 16, 2010

(86) PCT No.: PCT/EP2010/005682
§ 371 (c)(1),
(2), (4) Date: Mar. 13, 2012

(87) PCT Pub. No.: WO2011/035866
PCT Pub. Date: Mar. 31, 2011

(65) Prior Publication Data
US 2012/0168190 A1    Jul. 5, 2012

(30) Foreign Application Priority Data
Sep. 25, 2009 (DE) .......................... 10 2009 042 772

(51) Int. Cl.
*B25F 3/00* (2006.01)
*B23Q 16/02* (2006.01)
*B23Q 5/04* (2006.01)

(52) U.S. Cl.
CPC ............... *B23Q 16/025* (2013.01); *B23Q 5/04* (2013.01); *B23Q 2220/002* (2013.01); *Y10T 29/5155* (2015.01)

(58) Field of Classification Search
CPC ................... B23Q 2220/002; B23Q 2039/008; B23Q 2039/004; B23Q 5/04; B24B 5/00; B23B 29/242; B23B 3/168; B23B 49/006; B23B 13/04; B23B 29/32; B23B 39/205; B23B 5/08; B23C 5/08
USPC ................ 173/2, 176, 178, 47, 48, 50; 29/40
See application file for complete search history.

(56) References Cited

U.S. PATENT DOCUMENTS

| | | | | |
|---|---|---|---|---|
| 4,799,410 A | * | 1/1989 | De Bernardi | 82/159 |
| 5,613,929 A | * | 3/1997 | Bayer | 483/1 |
| 7,314,097 B2 | * | 1/2008 | Jenner et al. | 173/48 |
| 7,475,463 B1 | | 1/2009 | Chang et al. | |
| 2010/0056351 A1 | * | 3/2010 | Sahm et al. | 483/24 |
| 2013/0074301 A1 | * | 3/2013 | Stiefel et al. | 29/39 |

FOREIGN PATENT DOCUMENTS

| | | |
|---|---|---|
| DE | 101 30 446 | 1/2003 |
| WO | WO 03/000459 | 1/2003 |

* cited by examiner

*Primary Examiner* — Robert Long
(74) *Attorney, Agent, or Firm* — Roylance, Abrams, Berdo & Goodman LLP

(57) ABSTRACT

A drive device alternatively drives a tool disk (2) of a tool turret (4) or at least one machining tool fastened to the tool disk (2) by a retaining unit (6). Two drives (8, 10) can be driven by a common drive unit (14) having a drive shaft (12). The drives (8, 10) are connectable to an output (22, 20) by a coupling unit (18) that can be controlled by at least one actuating unit (16). The output is used alternatively to drive the tool disk (2) or the machining tool. The drive unit (14) is arranged inside the tool disk (2) together with the drives (8, 10).

17 Claims, 3 Drawing Sheets

DRIVE DEVICE

FIELD OF THE INVENTION

The invention relates to a drive device for alternatively driving a tool disk of a tool turret and at least one machining tool that can be secured on the tool disk by a retaining unit. The drive device has two drives that can be driven by a common drive unit having a drive shaft. The drives are connectable to outputs via a coupling unit. The coupling unit can be actuated by at least one actuating unit at a time. The outputs are used for driving the tool disk or the machining tool.

BACKGROUND OF THE INVENTION

These types of drive devices for tool turrets are used in industrial production, especially when the drive of a rotating machining tool is also to be implemented by a common drive unit in addition to a pivoting of the tool disk for selecting the machining tool required for a respective machining process.

U.S. Pat. No. 7,475,463 B1 discloses, for a cutting machine, the use of a common drive unit for alternatively driving a tool disk or a rotating machining tool attached to the tool disk by a retaining unit. The known solution provides that, for purposes of alternatively driving the tool disk or the machining tool, a shaft can be displaced into first or second axial positions, which shaft is driven by the drive unit and is provided with two drives in the form of tooth systems. The tooth systems are located offset axially relative to one another. In the first axial position of the shaft, a first drive of the shaft is decoupled from a first output for driving the machining tool, and a second drive in the form of an external tooth system is engaged to an output via which a pivoting of the tool disk can be effected. In a second axial position of the shaft, the first drive, designed to drive the machining tool on the shaft, engages the output for driving the machining tool so that the machining tool can be set into rotary motion. The known solution is relatively large and, for driving the tool disk and the machining tool, calls for several interacting tooth systems that are functionally connected in succession so that in the known solution a rather complex production is necessary to achieve the precision necessary in the industrial use for tool turrets.

Furthermore, DE 101 30 446 A1 discloses a tool turret with
a housing which is to be connected to a machine tool,
an electric drive motor,
a tool disk that is pivot-mounted relative to the housing, that can be secured in selectable angular positions and that has receivers for machining tools, and
at least one machining tool being drivable by the drive motor via shafts.

Since in the known solution the electric drive motor is located within the tool disk and since the drive shaft of the electric drive is flush with the drive shaft of the machining tool or is arranged to extend parallel, an economical drive concept for machining tools in a tool turret is achieved. Moreover, it manages with a small installation space. However, the known solution, for exclusive driving of the tool disk with the integrated drives for the respective machining tool, also requires an independent drive module that is generally integrated in the base on the housing side of the machine tool.

SUMMARY OF THE INVENTION

An object of the invention is to provide an improved drive device that enables alternatively driving a tool disk and a machining tool and that is characterized by a simple, compact and reliable construction that satisfies the low production tolerances required in industrial fabrication in its operation.

According to the invention, this object is basically achieved by a drive device where at least the drive unit together with the two drives are located within the tool disk. In addition to a very compact structure, the result is furthermore that both the driving of the tool disk and of the machining tool takes place over very short paths, especially without interposition of a larger number of shafts. As a result of this arrangement, a high precision arises both in the pivoting of the tool disk and in the driving of the machining tool. Furthermore, especially advantageously in industrial fabrication, due to the drive unit being located in the tool disk, no further installation space outside the tool disk is required for it. The small number of drives and outputs that are necessary result in a cost reduction in the production of the tool turret equipped with the drive device according to the invention. In industrial fabrication, in general the precise pivoting of the tool disk for selecting the machining tool required at the time take is especially important to place the tool in the shortest possible time. This requirement is likewise promoted by the drive unit located within the tool disk with drives. By contrast, in the cited prior art in the form of U.S. Pat. No. 7,475,463 B1, both the drive unit and the plurality of drives and outputs required are located outside the tool disk with the adverse consequences that arise therefrom for the required installation space as well as the attainable precision of that drive device.

In one advantageous exemplary embodiment, the respective drive is located within a receiving space in the tool disk between the drive unit and the machining tool to be driven. In this way, after the pivoting of the tool disk into its position corresponding to the selected machining tool, only the drive already located between the drive unit and the machining tool has to be coupled to the output assigned to the machining tool. In this way, the selected machining tool can be driven within an extremely short time after the pivoting of the tool disk.

In one exemplary embodiment, by the actuating unit, the respective drive is located coaxially to the drive shaft of the drive unit or able to be shifted parallel to it. A coaxially movable arrangement of the respective drive to the drive shaft on the one hand takes up an installation space that is as small as possible. Moreover, the coaxial arrangement yields a play-free, direct driving of the drive by the drive shaft of the drive unit.

In one preferred exemplary embodiment, the second drive is located coaxially to the first drive within the receiving space in the tool disk. A space-saving structure is achieved by a coaxial arrangement of the second drive toward the first drive.

In one preferred exemplary embodiment, the coupling unit has the two drives supported on the drive shaft in a torsionally strong manner and with a capacity to move axially relative to it. The torsionally strong connection of the coupling unit to the drive shaft ensures the transmission of torques from the drive unit to the coupling unit. The capacity of the coupling unit to move axially on the drive shaft permits providing axial positions of the coupling unit that are each assigned for alternatively driving the tool disk or of the machining tool.

In one especially preferred exemplary embodiment, by the tool disk, the machining tool secured on the tool disk by the retaining unit can be pivoted into a machining position in which, when the coupling unit has been actuated in one position, the drive and the pertinent output can be caused to engage one another for driving the actuating tool, while the other drive and the pertinent output for the tool disk are disengaged from one another until the engagement conditions are reversed by actuating the coupling unit into the other position. In this way, alternatively driving the tool disk or the machining tool is easily and reliably implemented. In this configuration, advantageously, a simultaneous driving of the tool disk and of the machining tool is precluded in this way since the coupling unit can only assume an unactuated or an actuated state.

In one preferred exemplary embodiment, the actuating unit includes a hydraulic cylinder encompassed at least in sections by the drive shaft. In the actuated state, the hydraulic cylinder adjusts the drive within the receiving space in the direction of the output of the machining tool to be driven and, in the unactuated state, adjusts them in the opposite direction to the output of the tool disk. An implementation of the actuating unit by a hydraulic cylinder, which is encompassed at least in sections by the drive shaft, supports a compact construction. This arrangement also ensures that for cylindrically executed drive a uniformly distributed adjusting force can be annularly applied to the drive by the hydraulic cylinder so that tilting or catching of the drive in the adjusting process along the drive shaft is largely precluded.

In one preferred exemplary embodiment, the drive unit including an electric motor with its coil winding is located on a column of the tool turret. Relative to that column, the tool disk is pivot-mounted around a pivot axis extending perpendicular to the drive shaft of the electric motor. This arrangement easily results in the drive shaft located coaxially within the coil winding of the electric motor extending perpendicular to the pivot axis of the tool disk and thus in the direction of the axis of rotation of a machining tool that is to be driven so that there is a direct driving without a further deviation in direction, especially for the driving of the machining tool. Instead of an electric motor, another motor can also be used, for example, in the manner of a pneumatic motor, belt drive, etc.

In one preferred exemplary embodiment, the tool disk can be secured in a defined manner in its preselectable pivot positions relative to the column by a locking unit of the tool turret. A defined securing of the tool disk in preselectable pivot positions is critical for a high-precision machining of workpieces since very high forces can occur on the machining tool, for example, in metal cutting. Even under such loads, the machining tool, which is secured by the retaining unit on the tool disk, remains secure in its intended position due to the locking unit. In one especial preferred embodiment of the drive device according to the invention, for the locking unit, a Hirth tooth system provides a very secure locking in the locked state and allows a still relative high-resolution pivoting of the tool disk due to the fineness of the system in the unlocked state of the locking unit. In another embodiment of the drive device according to the invention, a conventional brake disk solution known from the prior art can also be implemented for the locking unit.

In one preferred exemplary embodiment, the drives and outputs are made as tooth systems that interact in pairs with one another in a corresponding manner.

In one preferred exemplary embodiment, between the drive used to drive the tool disk and the tool disk, a Wolfrom planetary gear system is provided via which the drive energy is transmitted to the tool disk when the output for the tool disk is connected to the pertinent drive of the coupling unit. Wolfrom planetary gear systems are known for the very large transmission ratios that can be achieved. The use of this solution is especially advantageous for the drive device according to the invention, since the drive unit for driving the machining tool, such as, for example, a milling cutter or drill, depending on the diameter of the machining tool, must move the machining tool with very high speeds. Very high torques are not necessary in this machining. For a precise pivoting of the tool disk, only a low speed and a high torque are necessary. Thus, the drive unit can be dimensioned for the high speeds of the machining tool, and a suitable transmission ratio for pivoting of the tool disk can be achieved by the indicated Wolfrom planetary gear system optionally in interaction with other gear system elements.

In one preferred exemplary embodiment, the coupling unit is made at least in sections in the shape of a circular cylinder. On its outer circumference, this cylinder has the drive for the tool disk and, along its center axis and penetrated by it, has the drive for the machining tool to be driven. This execution of the coupling unit, especially in a coaxial arrangement of the axis of rotation of the machining tool to the circular cylindrical coupling unit, simplifies a direct transmission of the drive energy from the coupling unit to the machining tool so that here, there are only low losses and/or a low slip, and thus, a very high precision of the rotary motion of the machining tool. An arrangement of the drive for the tool disk on the outer circumference of the circular cylindrical coupling unit in turn for the drive device according to the invention allows the transition to output having a larger diameter than the outer circumference of the coupling unit, thus allowing a transmission ratio favorable for obtaining a greater torque and optionally being further increased by the downstream connection of other gear elements.

In one preferred exemplary embodiment, an outer circumferential-side tooth system of the coupling unit meshes with an inner circumferential-side tooth system of a recess of the drive shaft, and power is thus transferred from the drive shaft to the coupling unit. This arrangement implements a very compact solution since the coupling unit can thus be accommodated at least in sections in the drive shaft and the coaxial arrangement of coupling unit and drive shaft ensures a low-loss and precise transmission of force from the drive shaft to the coupling unit.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
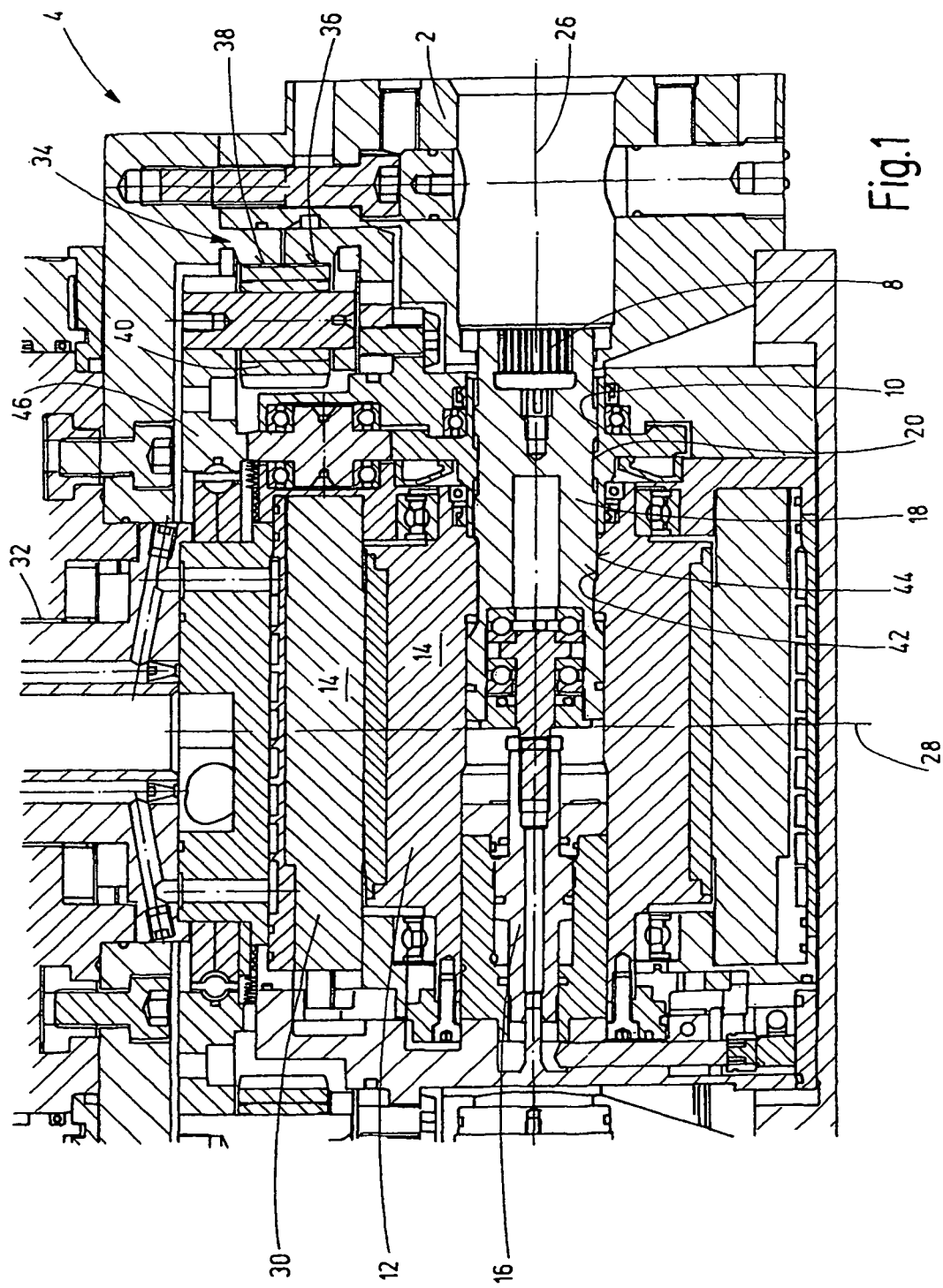
FIG. 1 is a partial side elevation view in section of a tool turret provided with a drive device according to an exemplary embodiment of the invention.
Figure 2:
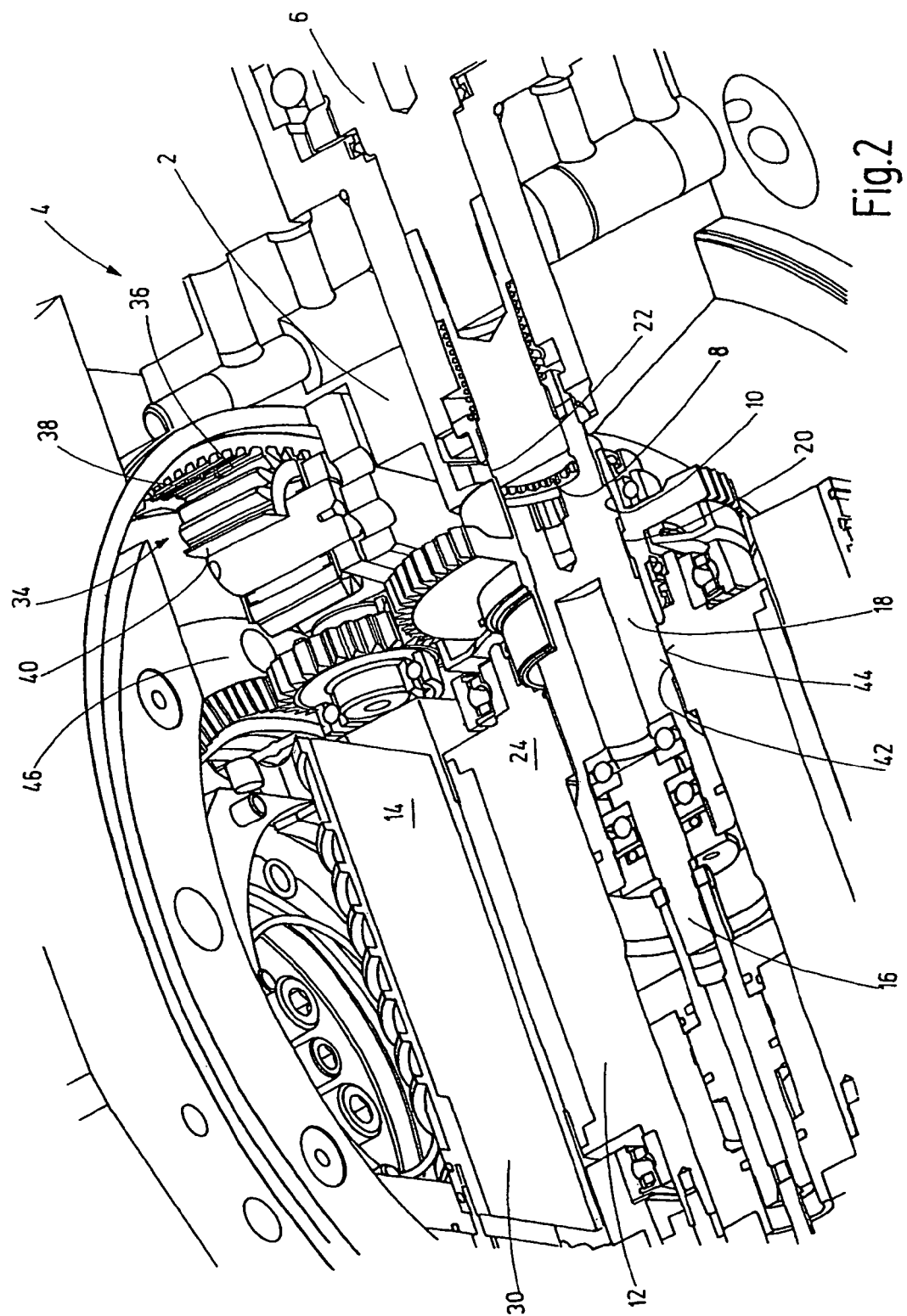
FIG. 2 is a partial perspective view, partially cutaway, of the drive device of FIG. 1 in a first state.

In the drive device shown in FIG. 1 for the alternatively driving a tool disk 2 of a tool turret 4 and of at least one machining tool (not shown) that can be secured by a retaining unit 6 (see FIG. 2) on the tool disk 2, driving takes place by first and second drives 8, 10 that can be driven by a common drive unit 14 having one drive shaft 12. The drives 8, 10 can be connected to first and second outputs 20, 22 via a coupling unit 18 that can be actuated by at least one actuating unit 16. In this connection, the output 22 is used to drive the tool disk 2, while the output 20 is used to drive the machining tool. The drive unit 14, including the outputs 20, 22, is located within the tool disk 2.

The respective drive 8 is located between the drive unit 14 and the machining tool to be driven within a receiving space 24 in the tool disk 2. The machining tool can be secured on the tool disk 2 by the retaining unit 6 shown in FIGS. 2 and 3.

By the actuating unit 16, each respective drive 8, 10 is arranged coaxially to the drive shaft 12 of the drive unit 14. In contrast to the exemplary embodiment of the drive device according to the invention, which is shown here, the respective drives 8, 10 can also be arranged to be able to move parallel to the drive shaft 12 of the drive unit 14 by the actuating unit 16.

The second drive 10 is located coaxially to the first drive 8 within the receiving space 24 of the tool disk 2.

The coupling unit 18 has the two drives 8 and 10 and is supported on the drive shaft 12 in a torsionally strong manner and with a capacity to move axially in the direction of the center axis 26 of the coupling unit 18 relative to the drive shaft 12.

By the tool disk 2, the machining tool secured on the tool disk 2 by the retaining unit 6 (see FIG. 2), can be pivoted into one machining position around a pivot axis 28. In the machining position of the tool disk 2, the drive 8 and the pertinent output 22 for the driving of the machining tool engage one another when the coupling unit 18 has been actuated in one position according to FIGS. 1 and 2. The other drive 10 and the pertinent output 20 for the tool disk 2 are disengaged from one another until the engagement conditions are reversed by actuating the coupling unit 18 into the other position (see FIG. 3).

The actuating unit 16 includes a hydraulic cylinder that is encompassed at least in sections by the drive shaft 12. In the actuated state (FIG. 1, FIG. 2), the hydraulic cylinder adjusts the drives 8 and 10 within the receiving space 24 in the direction of the output 22 of the machining tool to be driven and in the unactuated state (see FIG. 3) adjusts them in the opposite direction to the output 20 of the tool disk 2.

The drive unit 14 includes an electric motor with its coil winding 30 located on a column 32 of the tool turret 4. Relative to the column 32, the tool disk 2 is pivot-mounted around a pivot axis 28, which axis extends perpendicular to the drive shaft 12 of the electric motor.

The tool disk 2 can be secured in its preselectable pivoting positions relative to the column 32 by a locking unit of the tool turret 4 (not shown in the figures). For this purpose, a disk, connected torsionally-strong to the tool disk 2 and provided at least on one side with a tooth system, can be moved into a locking engagement position of a corresponding disk connected in a torsionally strong manner to the column 32. Instead of a locking device by intermeshing tooth systems, a locking in the form of a brake disk can be provided. These arrangements are not shown in FIG. 1 and are preferably located above the part of the tool turret 4 shown in FIG. 1, looking at FIG. 1 in the direction of the pivot axis 28.

The drives 8 and 10 and the outputs 22 and 20 are formed from tooth systems that interact with one another in pairs in a corresponding manner.

In the illustrated embodiment, the drive 8 corresponds to the output 22 of the machining tool, and the drive 10 corresponds to the output 20 of the tool disk 2.

Between the drive 10 used to drive the tool disk 2 and the tool disk 2 a Wolfrom planetary gear system 34 is provided via which the drive energy is transmitted to the tool disk 2 when output 20 for the tool disk 2 is connected to the pertinent drive 10 of the coupling unit 18.

Figure 3:
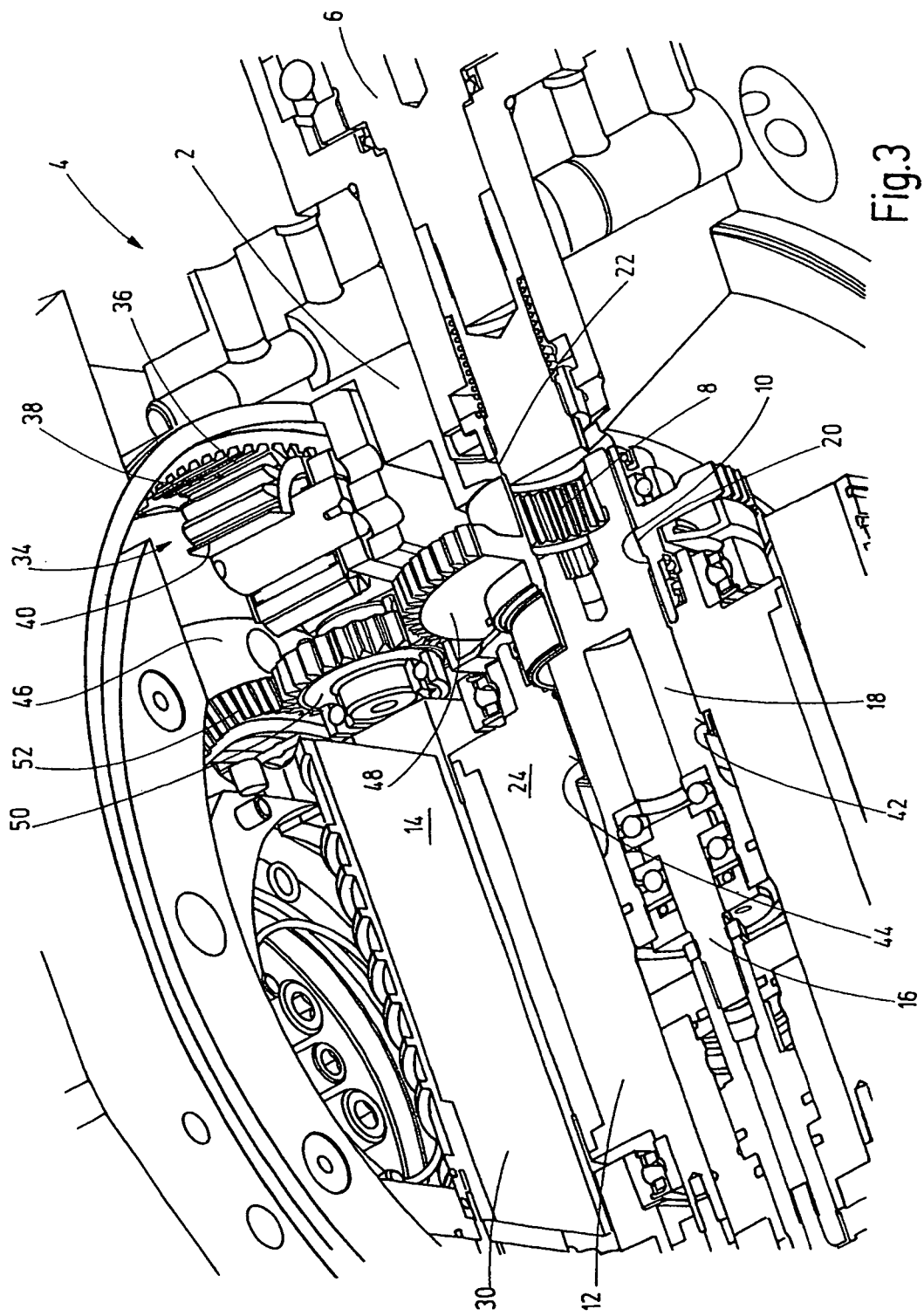
FIG. 3 is a partial perspective view, partially cutaway, of the drive device of FIG. 1, in a second state.

The Wolfrom planetary gear system 34 has a first internal tooth system 36 that is stationary relative to the column 32 as well as a second internal tooth system 38 that can turn relative to the column 32 jointly with the tool disk 2, and a planet gear 40 that meshes with the first and second internal tooth systems 36 and 38. FIG. 3 represents the state of the drive device for a driving of the tool disk 2. When coupling unit 18 has been set into rotation by the drive unit 14, the rotary motion is transmitted by the drive 10 and the output 20 to a first gear 48 engaged to a second gear 50. A disk 46, which is pivot-mounted with respect to the column 32 (see FIG. 1), on its side facing the second gear 50 has a circumferential rim gear 52. A rotary motion of the second gear 50 by engaging the rim gear 52 then leads to a rotary motion of the disk 46 on which the planet gear 40 is pivot-mounted. A rotation of the disk 46 then leads to the planet gear 40 running off on the internal tooth systems 36 and 38 of the Wolfrom planetary gear system 34. A relatively high speed of the shaft 12 of the drive unit 14 can then be stepped down to a relatively low speed of the tool disk 2. Instead of one planet gear 40, especially preferably several such planet gears can be used, especially preferably three or five.

The coupling unit 18 is made at least in sections in the shape of a circular cylinder. Its outer circumference has the drive 10 for the tool disk 2. Along its center axis 26, the cylinder is penetrated by the drive 8 for the machining tool that is to be driven.

Power is transmitted from the drive shaft 12 to the coupling unit 18 in the exemplary embodiment shown here by an outer circumferential-side tooth system 42 of the coupling unit 18, which meshes with an inner circumferential-side tooth system 44 of a recess of the drive shaft 12.

While one embodiment has been chosen to illustrate the invention, it will become understood by those skilled in the art that various changes and modifications can be made therein without departing from the scope of the invention as defined in the appended claims.

What is claimed is:

1. A tool turret, comprising:
   a tool disk;
   at least one machining tool secured on said tool disk by a retaining unit; and
   a drive device alternatively driving said tool disk and said machining tool about a tool disk axis and a machining tool axis, respectively, said drive device being located within said tool disk and including
   a common drive unit having a drive shaft,
   first and second drives driven by said drive shaft and connectable to first and second outputs, respectively, via a coupling unit, and
   an actuating unit coupled to and actuating said coupling unit to engage and disengage said first and second drives with said first and second outputs, respectively, and
   alternatively driving said tool disk and said machining tool.

2. A tool turret according to claim 1 wherein
   said first drive is located and dynamically connected between said drive unit and said machining tool with a receiving space in said tool disk.

3. A tool turret according to claim 1 wherein
   said actuating unit moves said first drive in an axial direction relative to said drive shaft.

4. A tool turret according to claim 2 wherein
   said second drive is located coaxially relative to said first drive within said receiving space of said tool disk.

5. A tool turret according to claim 1 wherein
   said coupling unit is supported on said drive shaft in a torsionally strong manner and is movable axially relative to said drive shaft.

6. A tool turret according to claim 1 wherein
said tool disk is pivotable to move said machining tool to and from one machining position therefor when said second drive is engaged with said second output and said first drive is disengaged with said first output by actuation of said coupling unit in a first direction; and
the machining tool is driven for machining operations in the one machining position therefor when said first drive is engaged with said first output and said second drive is disengaged with said second output by actuation of said coupling unit in a second direction opposite the first direction.

7. A tool turret according to claim 1 wherein
said actuating unit comprises a hydraulic cylinder encompassed at least in sections by said drive shaft having an actuated state engaging said first drive with said first output and an unactuated state engaging said second drive with said second output.

8. A tool turret according to claim 1 wherein
said tool disk is pivotable on a column about a pivot axis; and
said drive unit comprises an electric motor with coil windings thereof located on said column and with said drive shaft extending perpendicular to said pivot axis.

9. A tool turret according to claim 8 wherein
said tool disk is securable in each of preselected pivoting positions relative to said column by a locking unit.

10. A tool turret according to claim 1 wherein
said drives and said outputs comprise tooth systems that interact respectively with one another in pairs when the respective ones are engaged.

11. A tool turret according to claim 1 wherein
said second drive drives said tool disk about a column;
a Wolfrom planetary gear system is between said second drive and said tool disk transmitting drive energy to said tool disk when said second output is engaged with second drive by said coupling unit.

12. A tool turret according to claim 1 wherein
said coupling unit has, at least in sections thereof, a circular cylindrical shape, has said second drive for driving said tool disk on an outer circumference of said coupling unit and has said first drive for driving said machining tool along a center axis of said coupling unit.

13. A tool turret according to claim 1 wherein
an outer circumferential-side tooth system of said coupling unit meshes with an inner circumferential-side tooth system of a recess of said drive shaft to transfer power from said drive shaft to said coupling unit.

14. A tool turret according to claim 1 wherein
said Wolfrom planetary gear system comprises a first internal tooth system that is stationary relative to one of a machine-side column or a housing-side column, comprises a second internal tooth system that can turn relative to the one of the machine-side column or the housing-side column jointly with said tool disk and comprises a planet gear meshing with said first and second internal tooth systems.

15. A tool turret according to claim 14 wherein
rotary motion is transmitted by said second drive and said second output to a first gear engaged to a second gear when said coupling unit is rotated by said drive unit.

16. A tool turret according to claim 15 wherein
a first gear disk is pivotally mounted on said column and has a circumferential rim gear on a side thereof facing said second gear; and
rotary motion of said second gear by engaging said rim gear leads to rotary motion of a second gear disk, said planet gear being pivotally mounted on and rotated by said second gear disk via said internal tooth systems of said Wolfrom planetary gear system.

17. A tool turret according to claim 1 wherein
said first drive and said first output engage to drive said machining tool when said second drive and said second output are disengaged; and
said second drive and said second output are engaged to drive said tool disk to and from one machining position of said machining tool, while said first drive and said first output are disengaged.

* * * * *